No. 813,995. PATENTED FEB. 27, 1906.
W. J. ASHER.
AUTOMATIC APRON OR BELT GUIDE.
APPLICATION FILED NOV. 8, 1905.
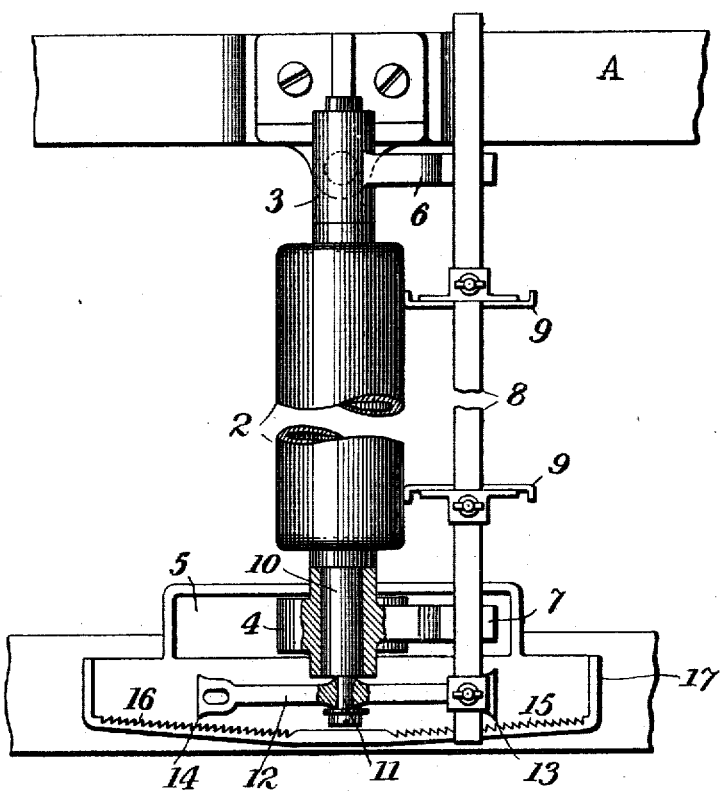
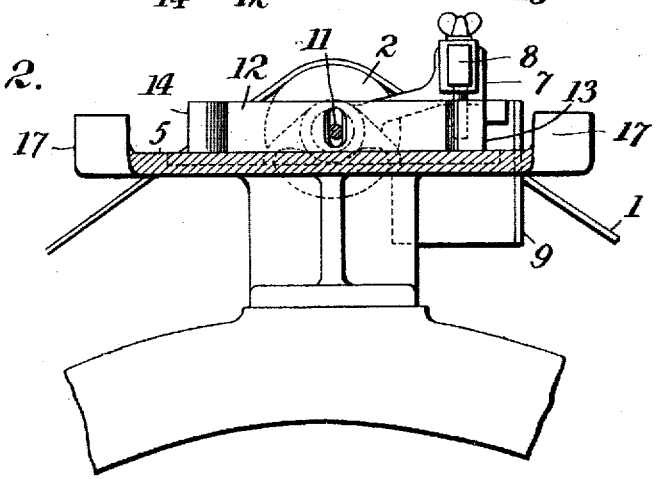

UNITED STATES PATENT OFFICE.

WILLIAM J. ASHER, OF WILLIMANTIC, CONNECTICUT.

AUTOMATIC APRON OR BELT GUIDE.

No. 813,995.  Specification of Letters Patent.  Patented Feb. 27, 1906.

Original application filed May 12, 1903, Serial No. 156,816. Divided and this application filed November 8, 1905. Serial No. 286,419.

*To all whom it may concern:*

Be it known that I, WILLIAM J. ASHER, a citizen of the United States, and a resident of Willimantic, Windham county, State of Connecticut, have invented certain new and useful Improvements in Automatic Apron or Belt Guides, of which the following is a specification.

The present application is a division of my application, Serial No. 156,816, filed May 12, 1903, which was patented February 21, 1905, under No. 782,813.

This invention relates to improvements in automatic belt or apron guides such as are used for preventing an endless belt or apron from running off of the pulleys or rollers upon which it runs.

The invention will be described in connection with the accompanying drawings, in which—

Figure 1 is a plan view of the guiding mechanism; and Fig. 2 is a side elevation of the same, parts being broken away.

Referring to the drawings, A indicates the frame of a machine, and 1 a belt or apron running over a roll or pulley 2. While the invention is particularly applicable to laundry machinery, such as the ironing-machine illustrated and described in my patent above mentioned, it will also be found useful in any mechanism in which a belt or apron is required to run true upon one or more rollers or pulleys. For the purpose of maintaining the belt properly centered on the rollers or pulleys over which it runs I provide an automatic angular adjustment of the roll 2, which is governed by the position of the apron itself, such angular adjustment being designed to return the apron to central position should it travel to one side or the other. Referring to the drawings, the roll 2 is mounted at one end in a swiveled bearing 3 and at the other end in a bearing-block 4, adapted to slide in a channel or way 5. On the bearings 3 and 4 are arms 6 7, which support the sliding rod 8. On this rod are adjustably mounted pads or plates 9, between which the apron travels, the pads being adjusted so that the apron will contact with one or the other should it travel laterally on the roll 2 from its normal position. On the end of the spindle 10 of the roll 2 adjacent to the sliding block 4 is a crank-pin 11, and which engages a slot in a sliding bar 12, having at its ends integral pawls 13 14 adapted to coöperate with the ratchets 15 16, formed in a stationary flange or bracket 17. The bar 12 is free to rock slightly on the pin 11, but it is confined on said pin by a head in such manner that but one of the pawls 13 14 can engage at a time with its corresponding ratchet. The bar 8 is pivotally connected with the pawl-bar 12, and the pawl-bar is thus controlled by the bar 8. It will be evident that a lateral movement of the apron one way or the other will effect the engagement of the corresponding pawl 13 or 14 with its ratchet. The pawls are constantly reciprocated by the crank-pin, and when one or the other is engaged with its ratchet the bearing-block 4 is fed along and the roll 2 given a corresponding angular adjustment. This angular adjustment tends to restore the apron to central position, and should it go beyond central position a reverse movement of the parts will be effected by the other ratchet and pawl. In operation these devices keep the apron closely in central position, returning it automatically if it deviates one way or the other.

The two series of ratchet-teeth 15 16 are inclined to a line parallel with the bearing-guide 5 for the purpose of arresting the travel of the bearing 4 when the lateral movement of the apron stops. It will be evident that if the series of ratchet-teeth were parallel with the guide 5 a given lateral movement of the apron would throw one of the pawls into engagement with its ratchet and might keep it in engagement with the ratchet sufficiently long to displace the roll 2 more than is necessary to bring the apron back to normal position. By inclining the planes of the ratchet-teeth as shown the pawls 13 and 14 keep moving away from the plane of the ratchet-teeth—that is, in a plane parallel with guide 5—as they move successively from tooth to tooth and become automatically disengaged at or about the time the lateral movement of the apron stops.

Having described my invention, what I claim as new, and desire to secure by Letters Patent, is—

1. An automatic apron or belt guide comprising a roll having a swiveled bearing at one end, a crank-pin on the opposite end of the roll, a pawl-bar reciprocated by said crank-pin and adapted to rock thereon, pawls on said bar, two series of ratchet-teeth adapted to coöperate respectively with said pawls, and means controlled by the apron for rocking the pawl-bar, the said pawls being normally out of engagement with their respective ratchet-teeth.

2. An automatic apron or belt guide comprising a roll having a swiveled bearing at one end, a crank-pin on the opposite end of the roll, a pawl-bar reciprocated by said crank-pin and provided with pawls at opposite ends, two series of ratchet-teeth arranged in planes at an angle to each other, and means controlled by the apron for rocking the bar upon the crank-pin to cause the pawls to engage with their respective ratchet-teeth should the apron vary from its normal path.

In testimony whereof I affix my signature in presence of two witnesses.

WILLIAM J. ASHER.

Witnesses:
WM. L. WILLIAMS,
C. P. MULLIGAN.